C. L. HOLT.
Filtering-Frame.

No. 210,534. Patented Dec. 3, 1878.

WITNESSES:
Charles E. Clifford
Francis M. Pennette

INVENTOR:
Charles L. Holt
Per att
William Henry Clifford

UNITED STATES PATENT OFFICE.

CHARLES L. HOLT, OF PORTLAND, MAINE.

IMPROVEMENT IN FILTERING-FRAMES.

Specification forming part of Letters Patent No. 210,534, dated December 3, 1878; application filed November 1, 1878.

*To all whom it may concern:*

Be it known that I, CHARLES L. HOLT, of Portland, county of Cumberland, and State of Maine, have invented certain new and useful Improvements in Filtering-Frames; and I hereby declare the following to be a full, clear, and exact description of the same, reference being had to the accompanying drawings, forming part of this specification, in which—

Figure 1:
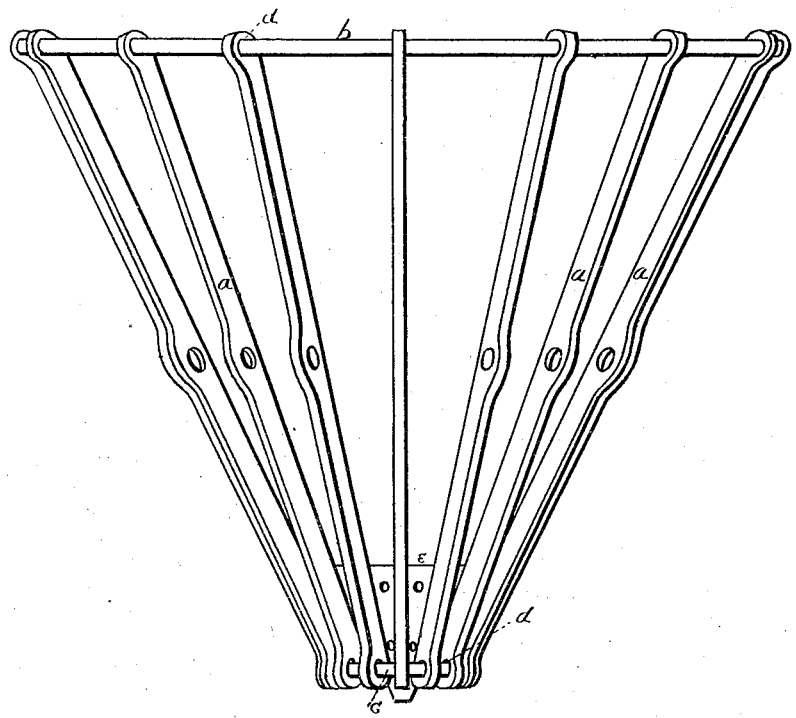
Figure 2:

Figure 1 is a side view of my invention. Fig. 2 shows views of the strainer.

The object of my invention is to provide a filtering-frame for chemists' and apothecaries' use, which will not corrode in consequence of the action of acids thereon, and which will prevent the filtering-paper from breaking away at the lower point or bottom. With a view to the first-named object, I make my filtering-frame of hard rubber.

In the accompanying drawings, $a$ shows the slats or bars which form the sides of the frame. These are arranged so as to form the funnel shape, as usual. They are united at the top by the rubber ring $b$, and at the bottom by the smaller-hard rubber ring $c$.

The slats $a$ are provided with holes $d$, to receive the rings which hold them together.

Other rubber rings passing through holes like those described may, if necessary, be provided at places intermediate between the two rings herein shown.

At the bottom or narrowest end of the filterer, and within the same, I place the strainer $e$, perforated with holes, also made of hard rubber, and removable when desired. It is conical in form, and so fits well into the lower end of the filterer. This device sustains the lower end or point of the filtering-paper, and prevents it from breaking or tearing out, and thus permitting the contents to run off without being filtered. This accident is quite likely to, and often does, occur when the paper has become saturated, and in consequence of the weight of the liquor placed therein.

The device referred to prevents such accident, and does not impede the passage of the liquor through the paper.

I am aware of the patent to Andrews, No. 162,294, of date April 20, 1875, but do not claim the construction therein patented.

What I claim as my invention, and desire to secure by Letters Patent, is—

The filtering-rack herein described, made of hard rubber, composed of the slats $a$, rings $b$ $c$, and having the separate and removable strainer $e$, as herein set forth.

CHARLES L. HOLT.

Witnesses:
 WILLIAM HENRY CLIFFORD,
 CHARLES E. CLIFFORD.